Nov. 17, 1970 N. L. CARR ET AL 3,541,003
TWO-PHASE VORTEX REACTION-SEPARATION SYSTEM
Filed March 6, 1968
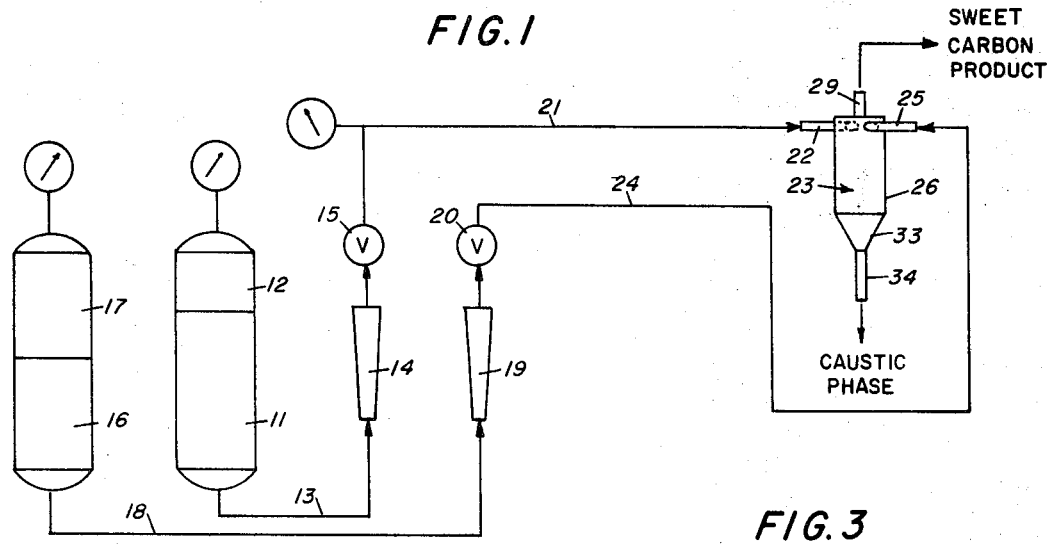
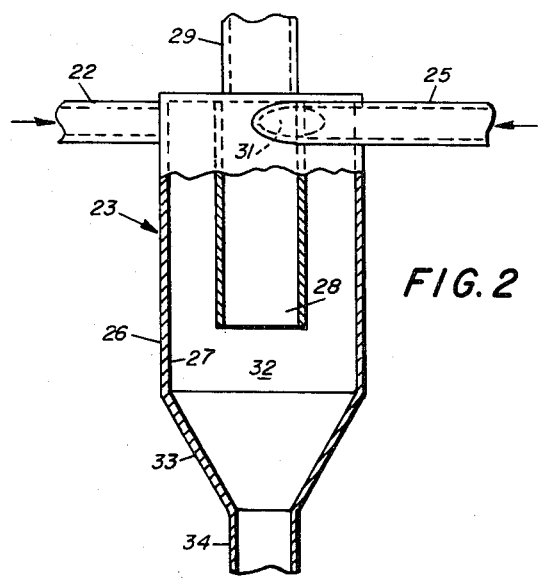
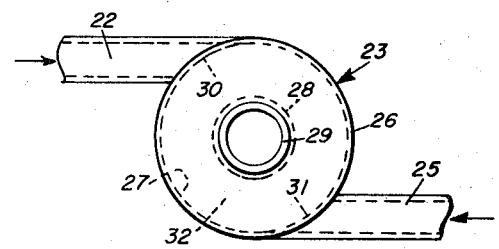
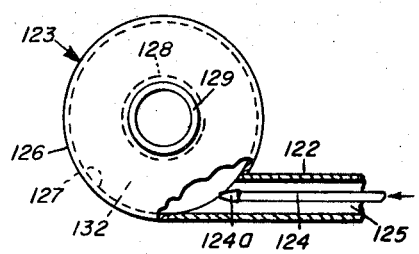
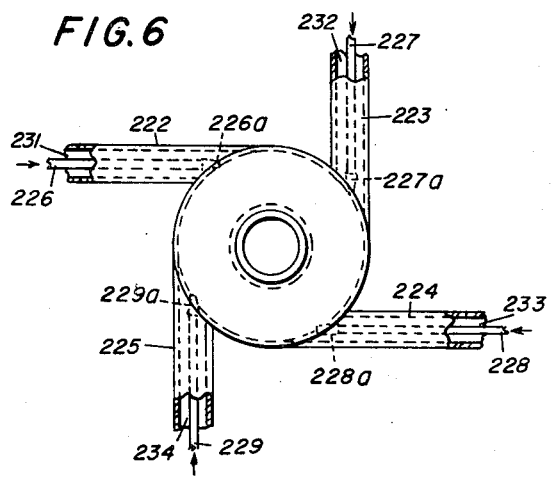
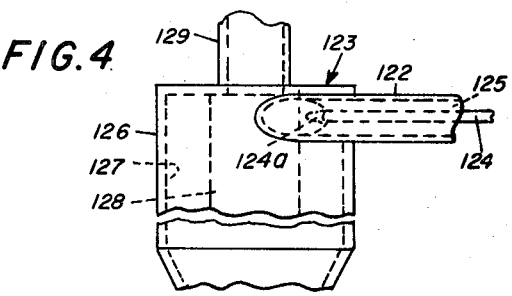
INVENTORS
NORMAN L. CARR
HARRY A. HAMILTON _United States Patent Office_

3,541,003
Patented Nov. 17, 1970

1

3,541,003
TWO-PHASE VORTEX REACTION-SEPARATION SYSTEM
Norman L. Carr, Allison Park, and Harry A. Hamilton, Natrona Heights, Pa., assignors to Gulf Research & Development Company, Pittsburgh, Pa., a corporation of Delaware
Filed Mar. 6, 1968, Ser. No. 710,979
Int. Cl. C10g 19/00, 31/14
U.S. Cl. 208—230     16 Claims

ABSTRACT OF THE DISCLOSURE

Continuous and instantaneous liquid-liquid phase reaction and separation of reaction products are achieved in a vortex reactor with the reacting liquid phase being tangentially injected into the periphery of the vortex reactor under pressure and the reacted liquid phases being continuously withdrawn from different portions of the reactor.

---

This invention relates to continuous liquid-liquid phase reactions and apparatus for conducting such reactions. More particularly, this invention relates to a liquid-liquid phase caustic treating process for sour hydrocarbon distillates and to apparatus for carrying out the process.

Various methods and means have been proposed for bringing about a chemical reaction between two or more liquid phases. For example, in the treatment of petroleum distillate oils that contain mercaptan sulfur, e.g., catalytically cracked gasolines, with caustic soda, it is conventional to contact the sour distillate and the caustic in tray-type towers with the sulfur-containing hydrocarbon and the caustic being either countercurrently or cocurrently contracted with each other. Residence times in excess of 50 minutes are required, for example, in typical caustic treating towers in order to attain the desulfurization reaction equilibrium. Reactors of this nature have several disadvantages. In addition to the relatively long periods of contact time required, the apparatus is fairly large and cumbersome.

A common device for obtaining intimate contact between reacting liquid phases is an agitated reaction vessel or a stirred tank reactor. The caustic treating reaction equilibrium can be obtained in periods of time as low as 12 to 15 seconds, when a stirred tank reactor is employed for the caustic treatment of sour hydrocarbons. However, extremely high turbine speeds are required and the excessive inputs of horsepower make such an operation prohibitively expensive for usage on a commercial scale. Processes of this nature require still further processing time and equipment for the separation of the resultant phases, i.e., the treated hydrocarbon and spent caustic phases.

It has now been found that liquid-liquid phase reactions may be continuously, rapidly, essentially completely and effectively conducted with substantially instantaneous mixing, reaction and separation of the products taking place in a single reactor. According to the present invention, a vortical reactor is provided for the conducting of liquid-liquid phase reactions in which a first liquid stream is tangentially injected under pressure into a vortical reaction zone while a second liquid stream is being tangentially introduced under pressure into the vortical reaction zone. The streams vortically flow through the reaction zone under turbulent conditions, mix, react and separate and a reacted first liquid stream is continuously withdrawn from an upper portion of the reaction zone while a second reacted liquid stream is withdrawn from a lower portion of the reaction zone. In this manner, liquid-liquid phase reactions are conducted in a continuous manner with essentially instantaneous reaction and separation of the reacted streams taking place in a vortical reaction zone.

According to a preferred embodiment of the invention, the first liquid stream is injected under pressure in the form of a jet into the vortical reaction zone, while the second liquid stream is being introduced under pressure into the reaction zone in a parallel, coaxial relationship with respect to the jet stream.

The apparatus of the present invention comprises a vortical reactor which has a generally cylindrical upper portion and a generally conical lower portion. The cylindrical upper portion is provided with at least two tangential fluid inlet lines. The cylindrical portion of the reactor is provided with a coaxially disposed outlet whose outer wall forms an annulus with the inner wall of the cylindrical portion of the reactor. The annulus extends below the inlet. The conical portion of the reactor is also provided with a fluid outlet.

According to the preferred embodiment of the invention, the cylindrical upper portion of the vortical reactor is provided with a tangential inlet comprising a fluid inlet jet coaxially disposed within the inlet in such a manner that an annulus is provided between the inner wall of the inlet and the outer wall of the jet.

In operation, tangentially-introduced streams flow into the reactor and turbulently mix and react while vortically flowing downward in the annulus that surrounds the outlet that is coaxial with the cylindrical portion of the reactor. In a substantially simultaneous manner the liquid phases interact and then separate with one reacted phase passing out of the cylindrical portion of the reactor while a second reacted phase passes out of the conical portion of the reactor.

Thus, the apparatus of the present invention provides a fast, effective means of continuously conducting liquid-liquid phase reactions and separation of the resulting products. The present apparatus possesses no moving parts and can be much smaller in size than the conventional tower-type reactors, since the reaction time is much less. Additionally, the energy requirements of the vortical reactor are much smaller than those of a stirred reactor which employs high speed turbine agitators in order to effect the degree of intimate mixing of the liquid phases which is required for successful operation.

The invention will be further illustrated by reference to the accompanying drawing. The description will be related to the liquid-liquid phase caustic treating of a sour hydrocarbon distillate for illustrative purposes.

In the drawing, FIG. 1 is a schematic, simplified flow diagram of a vortical reaction process;
FIG. 2 is an elevational view in section of a vortical reactor through its axis;
FIG. 3 is a vertical view of the reactor of FIG. 2;
FIG. 4 is an elevational view in section of a preferred form of vortical reactor through its axis;
FIG. 5 is a vertical view of the reactor of FIG. 4; and
FIG. 6 is a vertical view of a modified form of vortex reactor inlet means.

Referring to FIG. 1 of the drawing, a sour gasoline feedstock 11 containing between about 250 and about 1400 parts per million of mercaptan sulfur is discharged from a pressurized vessel 12 by means of the conduit 13. The sour hydrocarbon is passed through a rotameter 14 and a valve 15 by means of which the flow rate of the feed is controlled. Concurrently, a 10 percent solution of caustic soda 16 is discharged from the pressurized vessel 17 into the line 18 by means of which the caustic is conducted through rotameter 19 and valve 20.

It should be noted, of course, that FIG. 1 is schematic and therefore greatly simplified. Thus, many necessary pieces of equipment, such as valves, pumps, controls, etc., which are necessary for an efficient commercial operation, are not shown.

The sour hydrocarbon feed is conducted by means of line 21 to the tangential inlet 22 of the vortical reactor 23. The sour distillate is injected into the reactor 23 by means of the tangential inlet 22 at the end of line 21, at a velocity, for example, in the range of between about 10 and about 250 feet per second, preferably between about 40 and about 250 feet per second.

Concurrenlty, the caustic solution is passed by means of the line 24 into the tangential inlet 25 at the end of line 24 by means of which the caustic solution is introduced into the vortical reactor 23 with a whirling motion. The caustic solution may be suitably introduced into the vortex reactor at a velocity, for example, in the range of between about one and about 200 feet per second, preferably between about 10 and about 200 feet per second. The flow rates employed for the introduction of the respective liquid phases may be varied over a wide range. However, it is essential that the rates be sufficiently high to assure a turbulent flow of the streams and adequate intermixture of the streams in the vortex reactor.

A suitable caustic to hydrocarbon ratio for introduction into the reactor is, for example, in the range of between about 0.1 to about 10.0, preferably between about 0.3 to about 1.0.

The conditions employed in the reactor 23 may be selected from a wide range of process conditions. Any suitable temperature and pressure may be employed so long as liquid phase conditions are maintained in the reactor. For the caustic treatment process, suitable temperatures include those below about 80° F. and preferably between about 60° and about 80° F. A pressure drop across the reactor is usually experienced and this may be in the range of between 0 and about 100 p.s.i.g., preferably between about one and about 10 p.s.i.g.

Referring now to FIG. 2, which illustrates a vortical reactor as employed in FIG. 1 of the drawing, in section, the hydrocarbon and caustic are tangentially introduced by means of the inlets 22 and 25, respectively, into the cylindrical portion 26 of the reactor 23 at the periphery of the annulus that is formed by the inner wall 27 of the reactor 23 and the outer wall 28 of a coaxially disposed fluid outlet means 29. In this manner, the hydrocarbon and caustic streams are given a whirling or spinning motion. By means of the intimate contact induced by the combination of the whirling motion and the high velocity injection of the streams, a substantially instantaneous reaction of the caustic and the mercaptan sulfur of the hydrocarbon takes place under highly turbulent conditions.

The tangential relationship of the inlets 22 and 25 with respect to the periphery of the reactor 23 is more clearly shown in FIG. 3. The outlet portions of the inlets 22 and 25, respectively, are shown as being directly across the vortex reactor from each other. However, the tangential inlets 22 and 25 may be placed anywhere along the periphery of the annulus 32.

FIG. 4 illustrates a preferred embodiment of the present invention whereby the sour hydrocarbon feed line is conducted to a tangential inlet 122 of the vortical reactor 123. The sour hydrocarbon is injected into the reactor 123 by means of a jet inlet 124 which terminates in a jet discharge nozzle outlet 124a. The jet inlet 124 is coaxial with respect to the inlet 122 and an annular space 125 is formed between the outer wall of the jet inlet 124 and the inner wall of the tangential inlet 122. The caustic solution is introduced into the reactor 123 by means of the annular space 125 which surrounds the jet inlet 124 and jet nozzle 124a. The flow rates employed for the jet introduction of the sour hydrocarbon may be a velocity in the range of between about 10 or preferably 40 and about 250 feet per second, while the annular introduction of the caustic may be in the range of between about one or preferably 10 and about 200 feet per second.

The tangential relationship of the inlet 122 with respect to the reactor 123 is more clearly shown in FIG. 5. The jet nozzle 124a is preferably disposed immediately adjacent a peripheral portion of the annulus 132, so that the hydrocarbon and caustic streams are immediately subjected to a turbulent and vortical motion. If desired, the jet nozzle 124a may be positioned a short distance, e.g., a few inches or less, away from the periphery of the annulus in the fluid inlet 122. However, best results are obtained when the hydrocarbon jet stream discharges directly into the annulus 132 of the reactor 123.

FIG. 6 illustrates a modified version of the preferred form of the invention, wherein a plurality of parallel coaxial inlet means are employed along the periphery of the reactor. According to this embodiment of the invention, tangential inlets 222, 223, 224 and 225 are provided with jet inlet means 226, 227, 228 and 229, respectively. Each of the jet inlet means is provided with a jet nozzle 226a, 227a, 228a and 229a, respectively, for high velocity introduction of a reacting stream. Likewise, a second reacting stream is introduced in a parallel, coaxial manner with respect to the jet stream by means of the annular inlets 231, 232, 233 and 234. Thus, a mercaptan-containing hydrocarbon may be injected into the vortex reactor by means of the nozzles 226a, 227a, 228a and 229a, while a caustic solution is concurrently being introduced by means of the annular inlet means 231, 232, 233 and 234. In this manner, a high degree of intermixing of reactants is effected in the vortical reaction zone. Likewise, a plurality of separate inlet means like those shown in FIGS. 2 and 3 may be employed in the manner shown for the parallel, coaxial inlet means in FIG. 6.

As previously mentioned, the flow rates must be selected to assure turbulent flow of the streams in the vortex reactor. However, when the reacting streams are introduced in a parallel, coaxial relationship, particularly when the jet nozzle terminates at a point removed from the periphery of the vortex reactor 123, the flow rates employed preferably are sufficiently low so as to preclude annular-type flow in the inlet line 122. Although at times some intermixing and/or reaction in the inlet line 122 may occur and is permissible, the major portion of intermixing and/or reaction takes place within the vortex reactor 123.

The apparatus of the present invention permits a substantially instantaneous reaction to take place between the liquid phases. Accordingly, suitable nominal residence times in the case of the caustic treating of a sour hydrocarbon distillate are, for example, in the range of between about 0.01 and about 1.0 second, preferably between about 0.1 and about 0.3 second.

In the case of the caustic soda treatment of mercaptan sulfur-containing hydrocarbon distillates, the removal of the mercaptan sulfur by the caustic may be expressed by the following reactions and equilibria:

Referring again to FIG. 2, whirling caustic and hydrocarbon separate into a desulfurized hydrocarbon product, that is removed by means of the fluid outlet 29, and a spent caustic stream, which may be recovered from the conical portion 33 of the reactor 23 by means of the outlet 34. The purified hydrocarbon product contains between about 3 and about 75 parts per million mercaptan sulfur, being close to the equilibrium values.

There is a natural tendency for the treated hydrocarbon phase and the spent caustic phase to separate. However, this tendency is greatly amplified by virtue of the design of the vortical reactor 23. Thus, the vortical reactor not only provides a means for substantially instantaneous reaction of two liquid phases, but also provides a concurrent means for substantially instantaneous separation of the resulting reacted phases.

The vortex reactor of the present invention not only serves the dual function of being a combined reactor and product separator, but is capable of effecting this dual function substantially instantaneously. Thus, a desulfurization reaction and concurrent product separation may be achieved in less than about 1.0 second. By comparison, the same reaction requires 12 to 15 seconds nominal reaction time at a high turbine speed in a continuous stirred tank reactor in addition to the time required for product separation. Reaction time in a conventional contactor is usually about 10 to 60 minutes.

The invention will be further illustrated by the following nonlimiting examples.

EXAMPLES 1–3

An arrangement similar to that depicted in FIG. 1 is employed in the examples. A pentane feed containing about 0.2 percent by weight ethyl mercaptan is fed to a vortex reactor at calibrated rates from a pressurized propane cylinder, which is pressurized to 80 p.s.i.g. An aqueous caustic solution comprising 10 percent sodium hydroxide is concurrently metered from an 80 p.s.i.g. propane cylinder to the vortex reactor through an annular inlet. The liquid streams are fed to the reactor at a hydrocarbon-to-caustic volume ratio of 4 to 1.

A vortex reactor fabricated of glass and having a one inch inside diameter is employed. A hydrocarbon jet having a 1/16 inch inside diameter and a 3/32 inch outside diameter is surrounded by a 5/32 inch inside diameter caustic inlet line. Three runs are made at varying feed rates. The reaction rate constants for the runs are determined from the change in mercaptan sulfur between the feed and product hydrocarbon streams. Caustic extracts of the hydrocarbon samples from the feed and product streams are tested for mercaptan sulfur analysis by potentiometrically titrating the extract with silver nitrite solution to two equivalence points, representing sulfide sulfur and mercaptan sulfur. As an indicator, the potential between a saturated calomel reference electrode and a silver sulfide indicator electrode is employed.

The reaction rate constants are calculated by means of the following equation:

$$k = \frac{1}{\theta \phi}\left[\frac{C_o - C}{C - C_e}\right]$$

where:
$k$: overall rate constant, sec.$^{-1}$
$\theta$: time, defined at $V_T/F_T$
  $V_T$ = reactor volume, milliliters
  $F_T$ = total feed, milliliters per second
$\phi$: volume fraction of hydrocarbon in total feed
C: concentration of mercaptan sulfur: wt./wt.
  $C_o$: initial value
  $C_e$: equilibrium value The results of the runs are set forth in Table 1, below:

The comparative results of Examples 1–3 indicate that reaction rate constants increase with increasing feed rates and decreasing residence times. As seen in Table 1, the reduction of mercaptan sulfur in pentane from 1225 p.p.m. to 40 p.p.m. requires only about 0.25 second in the vortex reactor with a 5.05 ft.-lb./sec. energy input. By comparison, a reaction time of about 12 seconds and a 1.5 ft.-lb./sec. energy input is required to obtain an equivalent product in a stirred tank reactor.

EXAMPLES 4–6

The procedure of the previous examples is repeated employing a vortex reactor having a volume of about 11.5 milliliters. The hydrocarbon jet velocity employed in each instance is indicated in Table 2, below. The hydrocarbon jet is discharged directly into vortex reaction zone as shown in FIG. 3 of the drawing.

TABLE 2

| Example No. | Total flow (ml./min.) | Hydrocarbon jet velocity (ft./sec.) | Rate constant ($k$:sec.$^{-1}$) |
|---|---|---|---|
| 4 | 1,588 | 43 | 39 |
| 5 | 2,062 | 56 | 119 |
| 6 | 2,710 | 74 | 550 |

As many be seen from the foregoing results, the reaction rate constant for caustic treating increases with increased hydrocarbon jet velocities.

The following comparative examples illustrate the effect of hydrocarbon jet location on the reaction rate constant.

EXAMPLES 7–9

The procedure of Examples 4–6 is repeated, except that the hydrocarbon jet is discharged into the vortex reactor inlet line at a distance of 2 11/16 inches from the vortex. The total volume of the vortex reactor plus the inlet line is about 14 milliliters. The results are set forth in Table 3 below.

TABLE 3

| Example No. | Total flow (ml./min.) | Hydrocarbon jet velocity (ft./sec.) | Rate constant ($k$:sec.$^{-1}$) |
|---|---|---|---|
| 7 | 1,540 | 42 | 118 |
| 8 | 2,005 | 56 | 101 |
| 9 | 2,710 | 74 | 113 |

A comparison of the results set forth in Table 3 with those of Table 2 indicates that higher reaction rates are obtainable at the highest flow rate when the hydrocarbon jet is discharged directly into the vortex reactor, as opposed to discharging the hydrocarbon jet into the vortex reactor inlet line.

The following examples illustrate the effect of employing vortex reactors of varying dimensions.

EXAMPLES 10–13

Employing the identical procedures of the previous examples, the reaction rate constants set forth in Table 4 below were obtained while employing the vortex reactors having the dimensions indicated.

TABLE 1

| Example No. | Total feed (ml./min.) | Mercaptan in pentane Feed (p.p.m.) | Mercaptan in pentane Product (p.p.m.) | Percent of equilibrium | Reaction time (sec.) | Rate constant ($k$:sec.$^{-1}$) | Input power (ft.-lb./sec.) |
|---|---|---|---|---|---|---|---|
| 1 | 1,588 | 1,225 | *110 | 93.4 | 0.434 | 39 | 0.95 |
| 2 | 2,062 | 1,225 | 65 | 97.2 | 0.335 | 119 | 2.25 |
| 3 | 2,710 | 1,225 | 40 | 99.1 | 0.255 | 550 | 5.05 |

*Equilibrium = 30 p.p.m.

TABLE 4

| Example No. | Hydrocarbon jet I.D. (in.) | Jet Inlet I.D. (mm.) | Vortex reactor I.D. (in.) | Hydrocarbon phase Outlet I.D. (mm.) | Length (in.) | Cylindrical portion of reactor length (in.) | Vol. of annulus (ml.) | Vol./min. (caustic+oil ml./min.) | Rate constant (k:sec.⁻¹) |
|---|---|---|---|---|---|---|---|---|---|
| 10 | 1/16 | 4 | 1 | 13 | 1 | 1½ | 11.5 | 1,588 | 39.0 |
| 11 | 1/16 | 4 | 1 | 15 | 1⅛ | 3¾ | 12.0 | 1,470 | 7.38 |
| 12 | 3/32 | 6 | 1½ | 22 | 1 1/16 | 2⅞ | 22.0 | 2,500 | 2.89 |
| 13 | 3/32 | 6 | 1½ | 15 | 2⅞ | 5¾ | 63.0 | 2,500 | 0.67 |

Various modifications can be made within the scope of the present invention. For example, any suitable type of inlet means, e.g., nozzle, injector, etc., may be employed for introducing the parallel, coaxial jet stream of the invention. Although a restricted jet nozzle is depicted in the drawings, a small, uniform diameter tube having an unrestricted end portion could be likewise employed. However, it is preferred to employ a more restricted jet tip, since this results in a lower pressure drop in the jet line while providing a higher exit velocity. The present invention contemplates the use of a plurality of inlet means at a multiplicity of locations along the periphery of the reactor. Accordingly, two or more separate tangential inlets and/or parallel coaxial inlets may be employed for introducing the reacting liquid phases.

The present invention provides a high speed, low energy requirement means of conducting liquid-liquid phase reactions in addition to requiring less space and being less complicated than prior means that have been employed for such reactions. Furthermore, the vortex system of the present invention can effect both reaction and separation of reaction products in less time than most prior liquid-liquid reactors can effect the reaction, alone. While the present invention has been illustrated with respect to the removal of mercaptan sulfur from sour hydrocarbons with caustic soda, it may also be employed for conducting other liquid-liquid phase reactions. For example, it may be employed in the nitric oxidation of hydrocarbons; oxidation of methane to methanol; alkylation of olefins, and the like.

Obviously, many modifications and variations of the invention as hereinabove set forth can be made without departing from the spirit and scope thereof; and therefore only such limitations should be imposed as are indicated in the appended claims.

We claim:

1. A method for conducting continuous liquid-liquid phase reactions, which comprise tangentially injecting a first liquid stream under pressure into a vortical reaction zone, tangentially introducing a second liquid stream under pressure into said reaction zone, vortically flowing said first and said second liquid streams through said reaction zone under turbulent conditions, and continuously withdrawing a reacted first liquid stream from an upper portion of said reaction zone and a reacted second liquid stream from a lower portion of said reaction zone, said reacted first liquid being substantially immiscible in said reacted second liquid.

2. The method of claim 1 wherein the first liquid stream is in the form of a jet and the second liquid stream is introduced in a parallel, coaxial relationship with respect to said first liquid stream.

3. The method of claim 1 wherein the jet is introduced directly into the vortex of the reaction zone.

4. The method of claim 1 wherein the first liquid stream comprises a sour hydrocarbon distillate and the second liquid stream comprises caustic soda.

5. The method of claim 4 wherein a residence time of between about 0.01 and about 1.0 second is employed.

6. The method of claim 5 wherein a residence time of between about 0.1 and about 0.3 second is employed.

7. The method of claim 4 wherein the sour distillate is introduced into the vortical reaction zone at a velocity between about 10 and about 250 feet per second.

8. The method of claim 4 wherein a treated hydrocarbon distillate containing less than about 75 parts per million mercaptan sulfur is recovered from the upper portion of the vortical reaction zone.

9. The method of claim 1 wherein said first liquid stream is substantially immiscible with respect to said second liquid stream.

10. A method for contacting streams of first and second substantially immiscible liquids having different specific gravities, which comprises tangentially injecting a first liquid stream in the form of a jet under pressure into a vortical reaction zone, tangentially introducing a second liquid stream substantially immiscible with said first liquid stream and under pressure into said vortical reaction zone, vortically flowing said first and second liquid streams through said reaction zone under turbulent conditions for about 0.01 to about 10 seconds, and continuously withdrawing a reacted first liquid stream from an upper portion of said reaction zone and a reacted second liquid stream from a lower portion of said reaction zone, said reacted first liquid being substantially immiscible with said reacted second liquid stream.

11. A method for treating sour hydrocarbon distillates, which comprises tangentially injecting a sour hydrocarbon distillate stream under pressure into a vortical reacting zone, tangentially introducing a caustic solution stream under pressure into said vortical reaction zone, vortically flowing said sour hydrocarbon distillate and said caustic solution streams through said reaction zone under turbulent conditions until said sour hydrocarbon distillate stream is sweetened to less than about 75 parts per million of mercaptan sulfur, and continuously withdrawing the sweetened hydrocarbon distillate stream from an upper portion of said reaction zone and the caustic solution stream from a lower portion of said reaction zone.

12. The method of claim 11, wherein the sour distillate stream is in the form of a jet and the caustic solution stream is introduced in a parallel, coaxial relationship with respect to said sour distillate stream.

13. The method of claim 11 wherein a residence time of between about 0.01 and about 1.0 second is employed.

14. The method of claim 13 wherein a residence time of between about 0.1 and about 0.3 second is employed.

15. The method of claim 11 wherein the sour distillate is introduced into the vortical reaction zone at a velocity between about 10 and about 250 feet per second.

16. A method for conducting continuous liquid-liquid phase reaction, which comprises tangentially injecting a first liquid stream under pressure into a vortical reaction zone to vortically flow said first liquid stream through said reaction zone in a first direction, tangentially introducing a second liquid stream under pressure into said reaction zone to vortically flow said second liquid stream in said first direction, vortically flowing said first and said second liquid streams through said reaction zone under turbulent conditions, and continuously withdrawing a reacted first liquid stream from an upper portion of said reaction zone and a reacted second liquid stream from a lower portion of said reaction zone, and reacted first liquid being substantially immiscible in said reacted second liquid.

References Cited

UNITED STATES PATENTS

| | | | |
|---|---|---|---|
| 2,751,335 | 6/1956 | Carver et al. | 196—147 |
| 2,420,544 | 5/1947 | Jones | 196—32 |
| 2,319,738 | 5/1943 | Jones | 208—230 |
| 2,324,927 | 7/1943 | Heilman | 208—230 |

DELBERT E. GANTZ, Primary Examiner

J. M. NELSON, Assistant Examiner

U.S. Cl. X.R.

23—1; 196—46